E. O. HUBBARD.
BOLL WEEVIL CATCHER.
APPLICATION FILED JUNE 27, 1912.
1,053,036.
Patented Feb. 11, 1913.
2 SHEETS—SHEET 1.
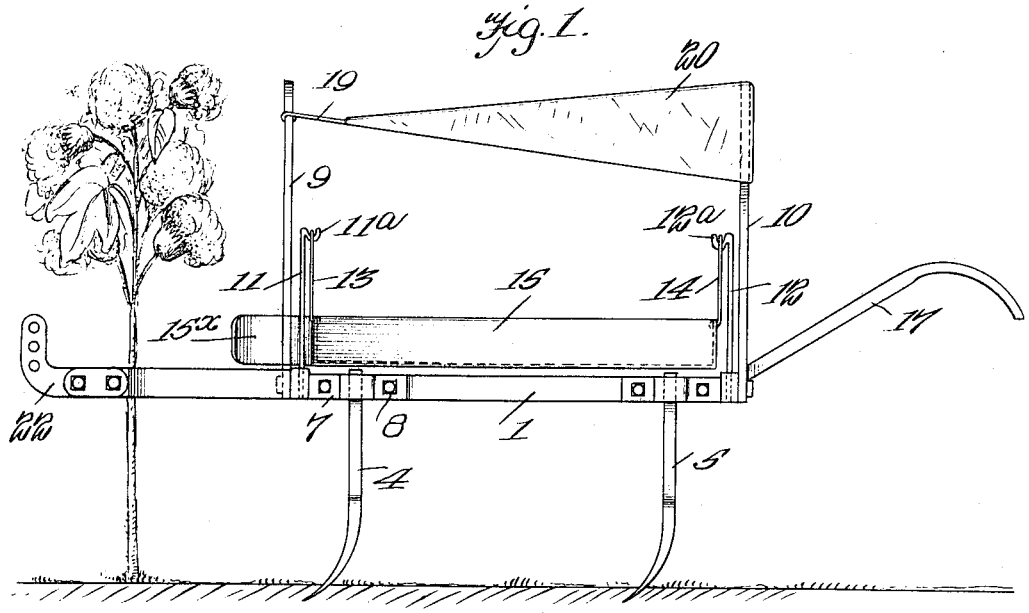
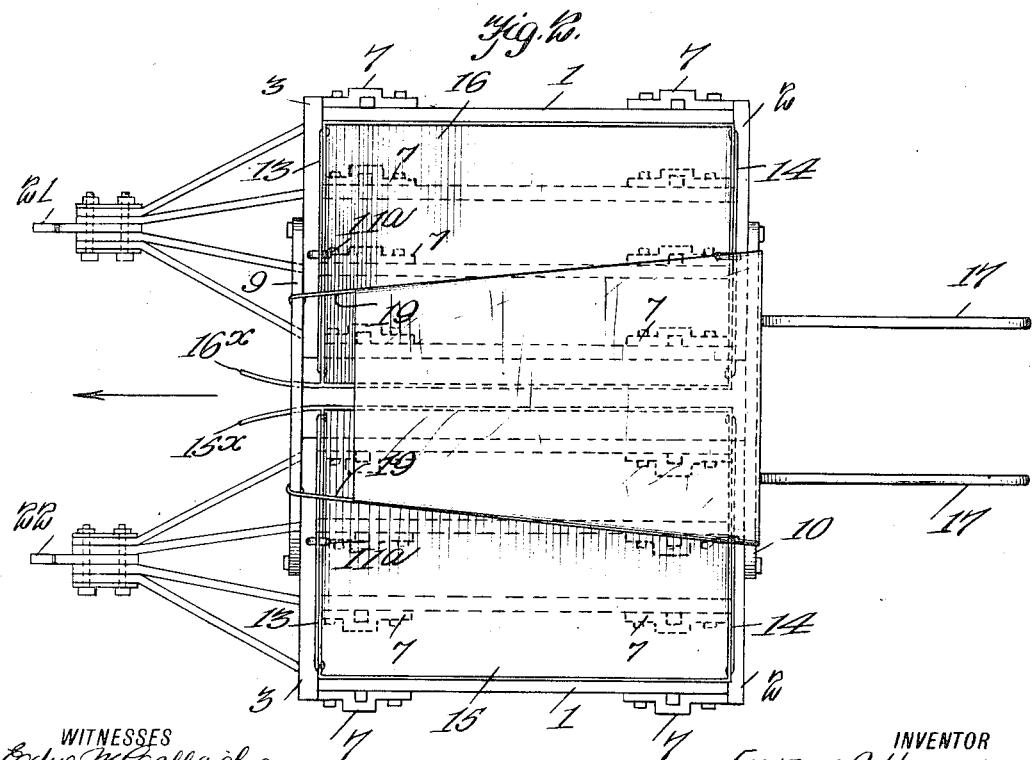
WITNESSES
INVENTOR
EUGENE O. HUBBARD,
BY
ATTORNEYS

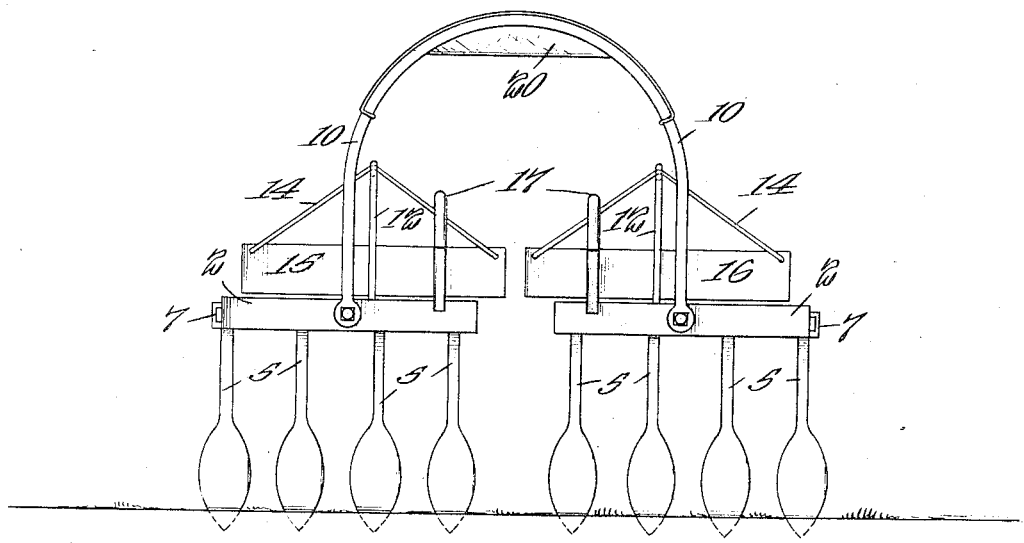
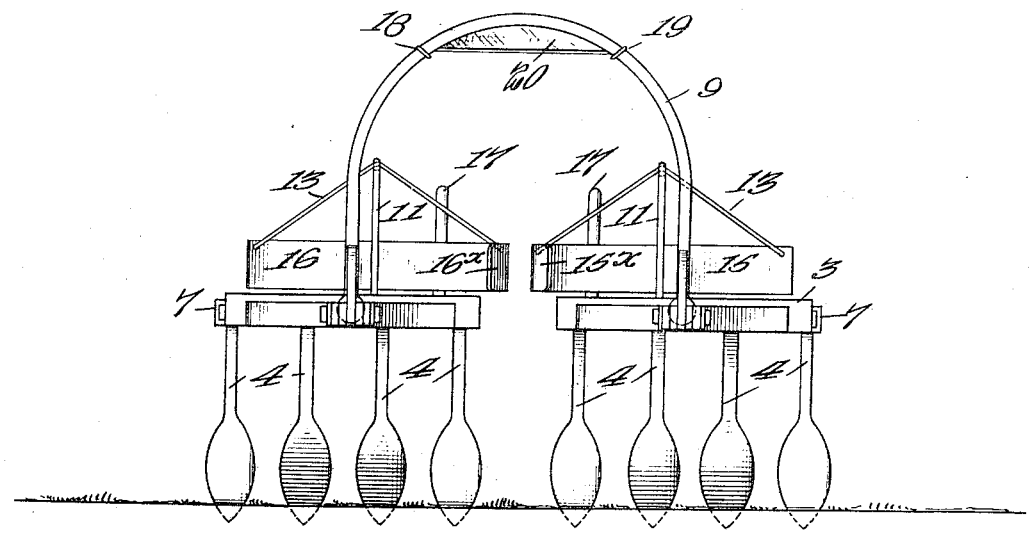

UNITED STATES PATENT OFFICE.

EUGENE O. HUBBARD, OF RAYMOND, MISSISSIPPI.

BOLL-WEEVIL CATCHER.

1,053,036.  Specification of Letters Patent.  Patented Feb. 11, 1913.

Application filed June 27, 1912. Serial No. 706,240.

*To all whom it may concern:*

Be it known that I, EUGENE O. HUBBARD, a citizen of the United States, and a resident of Raymond, in the county of Hinds and State of Mississippi, have invented a new and useful Improvement in Boll-Weevil Catchers, of which the following is a specification.

My invention relates to improvements in boll weevil catchers, and it consists in the combinations, constructions and arrangements herein described and claimed.

An object of my invention is to provide a device for catching boll weevils, and for simultaneously cultivating the cotton plants.

A further object of my invention is to provide a novel form of means for knocking the boll weevil from the cotton plants without injuring the latter.

A further object of my invention is to provide a device which may be manufactured cheaply, and which is not liable to get out of order.

Other objects and advantages will appear in the following specification, and the novel features of the invention will be particularly pointed out in the appended claims.

My invention is illustrated in the accompanying drawing forming a part of this specification, in which, Figure 1 is a side view of the device; Fig. 2 is a plan view thereof; Fig. 3 is a rear view; and Fig. 4 is a front view.

In carrying out my invention I provide a pair of frames which are arranged to bear cultivator teeth. These frames consist of the longitudinal members 1, the rear cross members 2 and the front cross members 3. Each of the longitudinal members 1 carries a front cultivator tooth 4, and a rear cultivator tooth 5, these teeth being preferably held by means of U-shaped clamp members 7 secured by bolts 8. As will be seen from Figs. 2, 3 and 4, there are two of these frames. They are pivotally held together at their front ends by means of a curved rod 9 while a similar curved rod 10 is pivotally attached to the frames at their rear ends.

Each frame member has extending from it two uprights, such as those shown at 11 and 12. These uprights are provided with hooked portions 11ª and 12ª respectively arranged to receive the bails 13 and 14 of the pans 15 and 16 respectively. The latter may be made of tin, galvanized iron, or any suitable material. The pan 15 is provided at its front end with a curved projecting portion 15ˣ, while the pan 16 has a similar projecting portion 16ˣ. To each frame is attached a handle 17.

Between the front curved rod or arch 9 and the rear arch 10 are disposed wires 18 and 19 upon which is stretched a fabric top 20 made of canvas or other suitable material. The purpose will be explained later.

The front part of the frames is extended, and is provided with bars 21 and 22 respectively to which horses may be attached.

From the foregoing description of the various parts of the device, the operation thereof may be readily understood.

The device is drawn along so that the arches straddle a row of the plants. The cultivator teeth 4 and 5 cultivate between the rows. The stems or stalks of the plants pass between the forwardly extending projections 15ˣ and 16ˣ and between the pans 15 and 16 which are pivotally suspended from the uprights 11 and 12. The tops of the plants are engaged by the canvas top 20 which will cause the plants to be shaken or knocked as it is passed along, thereby knocking off the boll weevils into the pans. At the same time the ground around the plant is being broken up by the teeth of the cultivator. As has been stated, each of the frames 1 is pivotally suspended to the arches 9 and 10. This permits the frames to be tilted so as to cultivate a row which is on a side hill. If for any other reason the ground is not level, the cultivator frame will be tilted at an angle, but the pan above it will swing close to the plant and will always remain horizontal. Moreover, the pans being on pivots may swing outwardly where a large plant is encountered so as to permit the plant to pass between the pans, but will swing again as soon as the plant has passed, and will at all times be as near the stalk of the plant as it is possible to get it. The boll weevils being knocked off into the pans may then be carried to a place where they may be destroyed by burning or otherwise.

It will be seen that the cultivator teeth have a double function, to-wit; that of the cultivator, and also as means for supporting the pans which catch the boll weevils. With this device, it is only necessary to go through the field to cultivate it, and to catch the boll weevils at one operation.

I claim:—

1. In a device for catching boll weevils, a pair of pivoted frames spaced apart to pass on opposite sides of a row of plants, cultivator teeth carried by said frames, a pan pivotally suspended from each frame, and means for connecting said frames together.

2. In a device for catching boll weevils, a pair of curved rods, a pair of frames pivotally suspended between said curved rods, said frames being spaced apart to pass on opposite sides of a row of plants, a pan pivotally suspended on each of said frames, and cultivator teeth attached to the bottoms of said frames.

3. In a boll weevil catcher, a front and a rear arch, a pair of frames pivotally mounted between said front and said rear arch, cultivator teeth carried by the bottoms of said frames, an upright at each end of each of said frames, and a pan pivotally suspended from the uprights above each frame.

4. In a boll weevil catcher, a front and a rear arch, a pair of frames pivotally mounted between said front and said rear arch, cultivator teeth carried by the bottoms of said frames, an upright at each end of each of said frames, a pan pivotally suspended from the uprights above each frame, means carried by said arches for knocking the boll weevils into the pans, said means comprising rods extending from one arch to the other, and a canvas top carried by said rods.

EUGENE O. HUBBARD.

Witnesses:
W. S. NEAL,
A. H. SIVLEY.